United States Patent [19]

Nelson et al.

[11] Patent Number: 4,895,428
[45] Date of Patent: Jan. 23, 1990

[54] HIGH EFFICIENCY RETROREFLECTIVE MATERIAL

[75] Inventors: John C. Nelson, Santa Rosa, Calif.; Sanford Cobb, Jr., St. Mary's Point, Minn.

[73] Assignee: Minnesota Mining and Manufacturing Company, St. Paul, Minn.

[21] Appl. No.: 224,387

[22] Filed: Jul. 26, 1988

[51] Int. Cl.$^4$ ............................................. G02B 5/124
[52] U.S. Cl. .................................... 350/103; 350/102; 428/161
[58] Field of Search ..................... 350/102, 103, 109; 428/161

[56] References Cited

U.S. PATENT DOCUMENTS

| | | | |
|---|---|---|---|
| 3,458,245 | 7/1969 | Stanley | 350/103 |
| 3,712,706 | 1/1973 | Stamm | 350/103 |
| 3,833,285 | 9/1974 | Heenan | 350/103 |
| 3,873,184 | 3/1975 | Heenan | 350/103 |
| 3,923,378 | 12/1975 | Heenan | 350/102 |
| 4,066,236 | 1/1978 | Lindner | 249/160 |
| 4,189,209 | 2/1980 | Heasley | 350/103 |
| 4,208,090 | 6/1980 | Heenan | 350/103 |
| 4,349,598 | 9/1982 | White | 428/161 |

FOREIGN PATENT DOCUMENTS 156406 7/1952 Australia .
269329 1/1988 European Pat. Off. .

OTHER PUBLICATIONS

Eckhardt, H. D., "Simple Model of Corner Reflector Phenomena", Applied Optics, pp. 1559–1566, vol. 10, No. 7, Jul., 1971.

Primary Examiner—Bruce Y. Arnold
Assistant Examiner—Loha Ben
Attorney, Agent, or Firm—Donald M. Sell; Walter N. Kirn; Robert H. Jordan

[57] ABSTRACT

The present invention provides a retroreflective material which has improved retroreflectivity at high angles of incidence. The retroreflective material comprises a transparent surface layer and an array of reflecting elements, each of the reflecting elements including a rectangular base having a length L, two tetragonal faces nearly perpendicular to each other and having a line of intersection of length Y, the length Y being less than said length L, a triangular face nearly perpendicular to the tetragonal faces; and a non-perpendicular triangular face forming an angle alpha with the plane perpendicular to the base, the angle alpha being preferably about $\sin^{-1}(0.25/n)$ to $\sin^{-1}(1/n)$, and more preferably about $\sin^{-1}(0.35/n)$ to $\sin^{-1}(0.9/n)$, where n is the refractive index of the reflecting elements, the perpendicular triangular face and the tetragonal face defining an approximate cube corner therebetween and the non-perpendicular triangular face and the tetragonal faces forming a non-orthogonal corner therebetween, the reflecting elements arranged with their base adjacent the surface layer.

24 Claims, 3 Drawing Sheets

$$R = \sin^{-1}\left(\frac{\sin I}{n}\right)$$

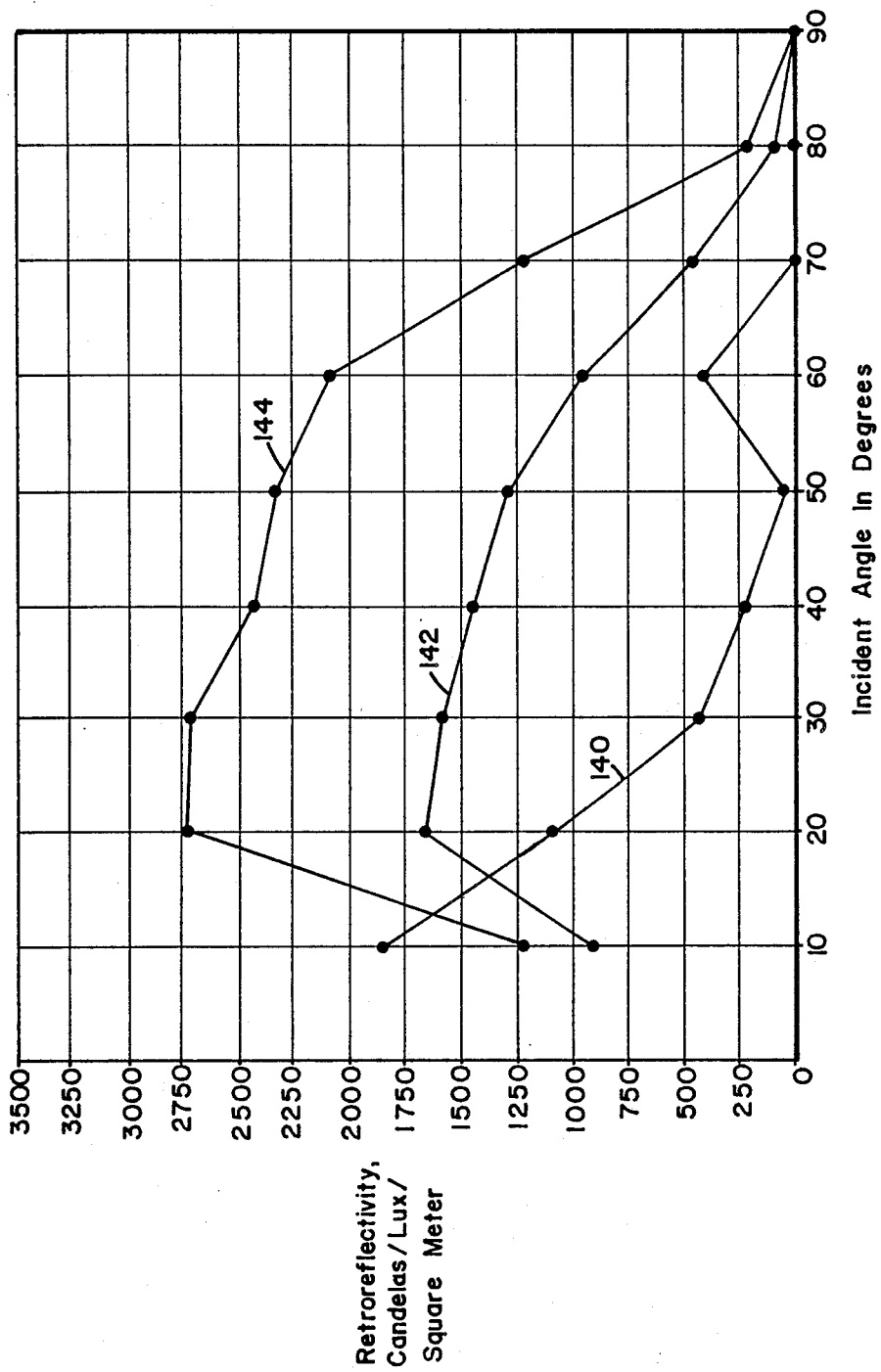

HIGH EFFICIENCY RETROREFLECTIVE MATERIAL

TECHNICAL FIELD

The present invention is directed to a retroreflective article, particularly to a retroreflective article which is optimized for one orientation and a high incident angle.

BACKGROUND OF THE INVENTION

Retroreflective materials are used extensively in making highway signs, street signs, pavement markers, and the like. A material which is retroreflective is characterized by its ability to return light toward the source of a non-perpendicular incident ray. This type of reflection is to be distinguished from mirrors, which cause specular reflection, or from diffuse reflecting surfaces, which scatter the incident light in all directions.

Retroreflective materials which employ cube-corner type reflecting elements are now well-known in the art. Cube-corner reflecting elements are trihedral structures which have three mutually perpendicular lateral faces meeting at a single corner, such as that configuration defined by the corner of a room or a cube. The retroreflectivity typically achieved by cube-corner type reflecting elements is through the principle of total internal reflection. A transparent cube-corner element receives a ray of incident light at an angle and sends it back in the same direction. See, for example, U.S. Pat. Nos. 3,924,929 and 4,672,089.

Cube-corner type retroreflective materials typically exhibit progressively less reflectivity as the incident angle of viewing light is increased. Generally, such materials lose significant amounts of reflectivity at incident angles greater than about 20°, and lose nearly all of their reflectivity when the incident angle becomes greater than about 40°. The angle of incidence is measured from the line perpendicular to the surface of the retroflective sheeting material.

A retroreflective material which utilizes the retroflective properties of a cube-corner, but which remains efficient at very high angles of incidence is described in the White patent, U.S. Pat. No. 4,349,598 (hereinafter "White" patent). The retroreflective material taught in the White patent is able to obtain retroreflection from a surface which is nearly parallel to the incident light. The reflecting elements described in the White patent are reflecting, transparent, right triangle prisms having a rectangular base, two mutually perpendicular rectangular faces meeting the base at 45° angles, and two parallel triangular faces perpendicular to the rectangular faces.

While successful in solving the problems of the use of retroreflective material at high incident angles, the White construction has certain drawbacks. The required vertical cuts between the White reflecting elements cause a 25 to 50% loss of the effective area of the material from which light is retroreflected (effective area). Also, the presence of the two parallel vertical surfaces at each end of the individual reflective elements makes molding a difficult task. The vertical surfaces provide no relief angle to aid in removal of the reflective sheeting from the mold. As a result, great stress is exerted on each of the individual retroreflective elements as the material is stripped from the mold. Such stresses can lead to deformation of the individual retroreflective elements, causing deviations in the intended retroreflection pattern of the retroreflective material.

Many cube corner designs, including the White design, are not designed to obtain a maximum effective aperture for each retroreflective element. For example, the individual elements of a canted trihedral cube corner material may have an effective aperture of roughly 30%, and an element of the White design roughly 70%.

Therefore, a need exists for an improved retroreflective material which is effective at high angles of incidence. Further, there is a need for such a retroreflective material which has elements with a high percentage of effective aperture, a high percentage of effective area of the sheeting, and which has a design which is easily molded in commercial molding techniques.

SUMMARY OF THE INVENTION

The present invention provides a retroreflective material which has improved retroreflectivity at high angles of incidence. The reflecting elements of the retroreflective material of the invention each have a triangular face which is slanted from the perpendicular. In addition to its optical advantages, this slanted face aids in the molding of the retroreflective material.

The retroreflective material of the present invention comprises a transparent surface layer and an array of reflecting elements, each of the reflecting elements including a rectangular base having a length L, two tetragonal faces nearly perpendicular to each other and having a line of intersection of length Y, the length Y being less than said length L, a triangular face nearly perpendicular to the tetragonal faces; and a non-perpendicular triangular face forming an angle alpha with the plane perpendicular to the base, the angle alpha being preferably about $\sin^{-1}(0.25/n)$ to $\sin^{-1}(1/n)$, and more preferably about $\sin^{-1}(0.35/n)$ to $\sin^{-1}(0.9/n)$, where n is the refractive index of the reflecting elements, the perpendicular triangular face and the tetragonal faces defining an approximate cube corner therebetween and the non-perpendicular triangular face and the tetragonal faces forming a non-orthogonal corner therebetween, the reflecting elements arranged with their bases adjacent the surface layer.

The retroreflective materials of the present invention may also be individually tailored so as to distribute light retroreflected by the articles into a desired pattern or divergence profile. The reflecting elements of the present invention are formed by two perpendicular intersecting sets of parallel grooves. A first set of V-shaped grooves, has a first and second face. A second set of grooves has a third face approximately perpendicular to the surface layer and a fourth face which is not perpendicular to the surface layer. At least one of the first, second, or third sets of faces includes in a repeating pattern, at least one groove side angle that differs from another groove side angle of the same set. The array of retroreflective elements comprise subgroups or subarrays, each comprised of a plurality of cube corner retroreflective elements in a plurality of distinctive shapes that retroreflect incident light in distinctively shaped patterns. At least one of the distinctive shapes is a no-northogonal cube corner retroreflective element, by which is meant that at least one face of the element is tilted at an angle that differs from the angle which would be required for all dihedral angles within the element to be orthogonal. Even though the dihedral angles are not all orthogonal, such a configuration is still regarded as a cube corner herein, because it closely resembles the orthogonal cube corner in shape and function.

Groove side angle is defined as the angle between the groove side and a plane extending parallel to the length of the groove and perpendicular to the plane defined by the bottom edges of the two intersecting sets of grooves. If the groove bottoms are not coplanar, the reference surface is the front side of the transparent surface layer (i.e., the side of the reflective material that would normally face the viewer). Thus, the plane of reference would be parallel to the length of the groove and perpendicular to the front side surface of the transparent surface layer. For example, for the first and second faces of the V-shaped grooves which define the tetragonal faces, the groove side angle will be approximately 45° for perpendicular bisector elements. For the grooves which define the third nearly perpendicular triangular face and the fourth non-perpendicular face, the groove side angle will be approximately 0° and the angle alpha, respectively.

Although the terms such as nearly perpendicular or approximately perpendicular are used herein, embodiments of the inventive retroreflective material (sheet) having dihedral angles which are in fact, 90° are within the scope of the invention as well.

BRIEF DESCRIPTION OF THE DRAWINGS

FIG. 7 is a plot comparing the retroreflectivity of a material of the invention with conventional material and with White material.

DETAILED DESCRIPTION OF THE PRESENT INVENTION

Figure 1:
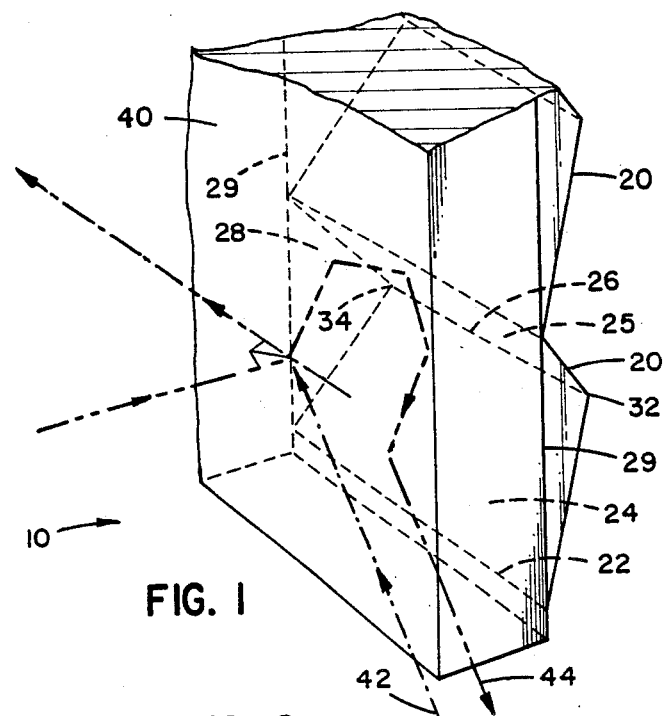
FIG. 1 is a fragmentary, partly schematic perspective view of reflecting elements of the invention.
Figure 6:
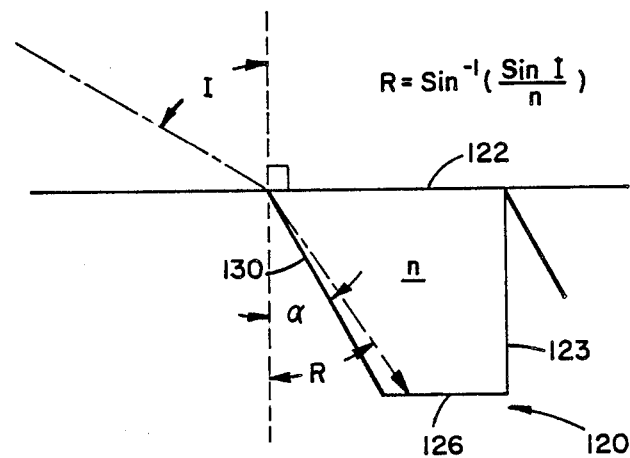
FIG. 6 is a schematic vertical section of a retroreflective element.

Referring first to FIG. 1, a retroreflective material 10 is shown having reflective elements 20 adjacent a cover sheet 40. The reflecting elements 20 include a rectangular base 22, having a length L, and a pair of tetragonal faces 24 and 25. The tetragonal faces 24 and 25 intersect along a line 26, having a length Y. The reflecting element 20 further includes a perpendicular triangular face 28 which lies approximately perpendicular to the base 22, and a non-perpendicular triangular face 30 which forms an angle alpha with the plane perpendicular to the base 22. The angle alpha is best shown in FIGS. 4 and 6.

The tetragonal faces 24 and 25 and the non-perpendicular face 30 form a non-orthoganol corner 32. The tetragonal faces 24 and 25 and the perpendicular face 28 form a cube-corner 34.

An example of the total internal reflective properties of the material 10 is illustrated in FIG. 1 by a ray of incident light 42 which enters the cover sheet 40 and is impinged into the element 20. The light ray 42 is reflected by internal reflection of the ray 42 from the face 28 to the face 25 to the face 24 and returns towards the source through the sheet 40 as retroreflective light ray 44.

Figures 2, 3:
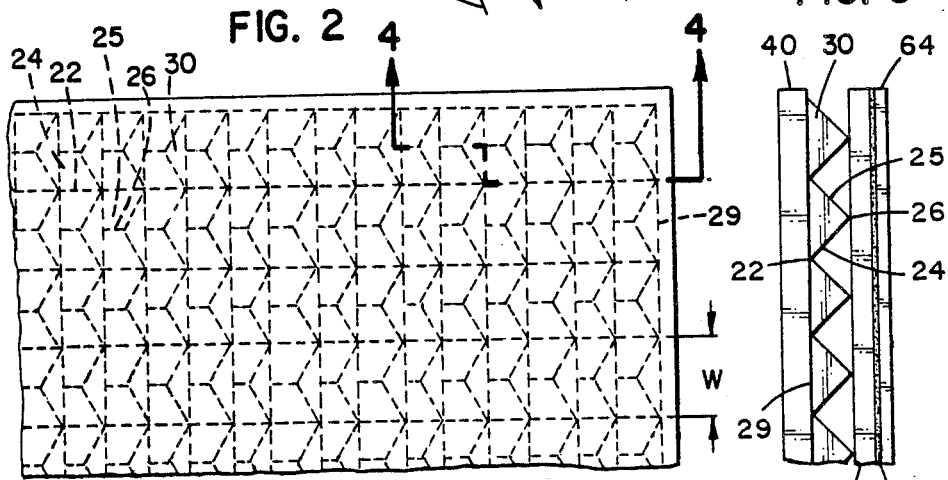
FIG. 2 is a fragmentary, plan view of one embodiment of reflective material of the invention.
FIG. 3 is a side elevation of the material of FIG. 2.
Figure 4:
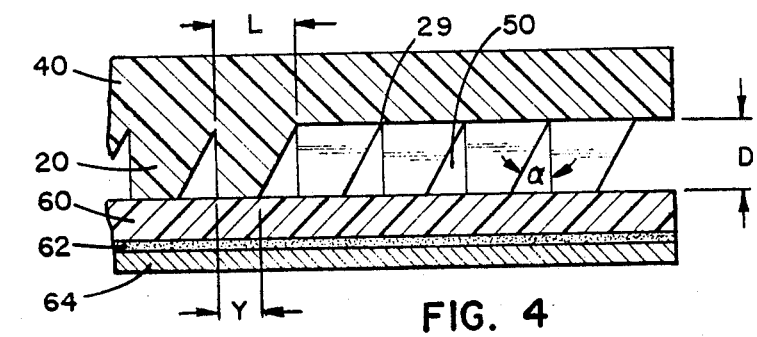
FIG. 4 is a vertical section along the line 4—4 of FIG. 2.

Referring to FIGS. 2-4, the reflecting elements 20 are uniformly arranged in rows, as shown in FIG. 2, with non-perpendicular triangular faces 30 adjacent to the perpendicular faces 28 of neighboring reflecting elements 20. This arrangement yields a retroreflector with a high effective area, i.e., the percentage of the area of cover sheet 40 over which retroflection takes place is relatively high. In the embodiment shown in FIG. 2-4, the neighboring triangular faces 30 and 28 share a common base 29. The faces 28 and 30 form a groove 50, as shown in FIG. 4. If channels (not shown) are left between the rows of reflecting elements 20, the retroreflective material 10 is still operable, but becomes less efficient, as the effective area is decreased.

In the embodiment of the present invention shown in FIG. 4, the retroreflecting elements 20 are attached to a backing material 60 which has an adhesive layer 62, which is used to attach the retroreflective material 10 to a signing material 64. Also shown in FIG. 4 are the angle alpha, the lengths L and Y, and the depth D. The width, W, of the elements 20 is shown in FIG. 2.

Figure 5:
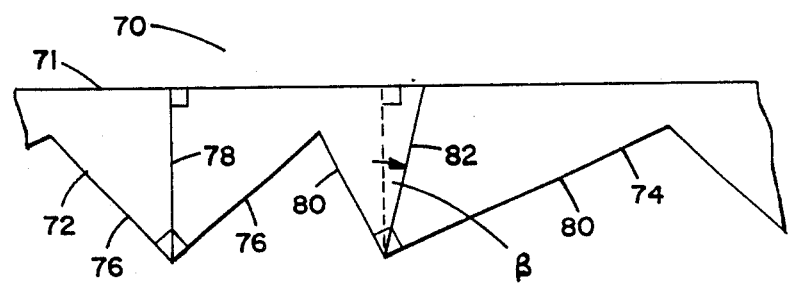
FIG. 5 is a schematic partial vertical section of another embodiment of the retroreflective material of the invention.

Referring to FIG. 5, a schematic cross-section of an alternative embodiment of the present invention is shown. A fragmentary view of a retroreflective material 70, which permits improved angularity in the horizontal direction, is shown. Such improved angularity is important, for example, in pavement markers, or vertical barrier delineators. Retroreflective material with low angularity will only brightly retroreflect light that impinges on it within a narrow angular range centering approximately on its optical axis. Angularity is measured in a plane perpendicular to the plane of the incident angle. For example, in a pavement marker positioned on a highway, the incident angle is the angle between the light beam from the car headlights to the pavement marker and a line perpendicular to the reflective sheeting surface in the pavement marker. Angularity is a property of the sheeting defined as the largest angle in any direction, including away from a line perpendicular to the reflecting surface at which the marker will still be an effective retroreflector.

In FIG. 5, reflecting elements 72 and 74 having a base 71 are shown. Element 72 has a pair of perpendicular tetragonal faces 76 which intersect to define a substantially perpendicular angle. A bisector 78 bisects the angle between the faces 76 and intersects the base 71 at a substantially perpendicular angle. This is a construction similar to that shown in FIGS. 1-4 and will sometimes be referred to herein as perpendicular bisector elements.

The element 74 has a pair of tetragonal faces 80 which intersect to define a substantially perpendicular angle which has a bisector 82. The bisector 82 intersects the base 71 at an angle, other than substantially 90°. The angle, Beta, is the angle between the line perpendicular to the base 71 and the bisector 82. Elements such as these will sometimes be referred to as canted bisector elements.

A retroreflective material designed to have improved angularity may include elements, some or all of which are canted bisector elements such as element 74. The angle, Beta, can, for example, be the same angle for all of the elements, can be varied randomly, can be varied uniformly, or can be designed in a number of repeating or random patterns for the particular end use.

Referring to FIG. 6, a schematic view of a reflecting element 120 is shown. The reflecting element 120 has a rectangular base 122 with a length L, which is greater than the line of intersection 126, which has a length Y. Lying between the base 122 and line 126 is a non-perpendicular triangular face 130 which slants into the reflecting element 120 from the base 122 towards a perpendicular face 123.

The angle alpha is preferred to be no greater than the critical angle of the material. It is generally within the range of 6° to 65°. As demonstrated in FIG. 6, if a ray of incident light strikes the surface of the element 120 at an incident angle, I, in accordance with Snell's law it will be refracted at an angle, R, determined by the refractive index, n, of the element 120; $R=\sin^{-1}(\sin I/n)$. It is preferred that the angles alpha and R be equal for the intended angle I for the reflective material in actual use. Table I shows the angle, R, for various incident angles, I, calculated for acrylic, $n=1.492$, and polycarbonate resins, $n=1.586$.

TABLE I

| | R | |
|---|---|---|
| I | n = 1.492 | n = 1.586 |
| 15.0° | 10.0° | 9.4° |
| 20.0° | 13.2° | 12.4° |
| 25.0° | 16.4° | 15.4° |
| 30.0° | 19.6° | 18.4° |
| 35.0° | 22.6° | 21.2° |
| 40.0° | 25.5° | 23.9° |
| 45.0° | 28.3° | 26.5° |
| 50.0° | 30.9° | 28.9° |
| 55.0° | 33.3° | 31.1° |
| 60.0° | 35.5° | 33.1° |
| 65.0° | 37.4° | 34.8° |
| 70.0° | 39.0° | 36.3° |
| 75.0° | 40.3° | 37.5° |
| 80.0° | 41.3° | 38.4° |
| 85.0° | 41.9° | 38.9° |
| 90.0° | 42.1° | 39.1° |

A 100% effective retroreflective aperture will be closely approached if the length Y is equal to (0.5) (D) tangent (alpha), and the length L is equal to (D) tangent (alpha). Effective aperture refers to the portion of each reflecting element which is utilized to retroreflect the light. In some prior art configurations, the reflective elements have large dark or dead spots which are not used to retroreflect light.

While reflecting elements and surface layer materials may be chosen having different refractive indexes, n, different refractive indexes typically complicates the design. Thus, it is preferred that the reflecting elements and cover sheet materials have the same refractive index.

Useful materials for making the cover sheet and reflective elements, are preferably materials which are dimensionally stable, durable, weatherable, and readily formable into the desired configuration. Examples of suitable materials include acrylics, which generally have an index of refraction of about 1.5, such as Plexiglas resin from Rohm and Haas; polycarbonates, which have an index of refraction of about 1.6; reactive materials such as taught in United Kingdom Pat. No. 2,027,441; polyethylene-based ionomers (marketed under the name of "SURLYN"); polyesters; and cellulose acetate butyrates. The cover sheet may also include UV absorbers or other additives as needed.

A suitable backing layer may be made of any transparent or opaque material, including colored or noncolored materials, which can be sealingly engaged with the retroreflective elements 20. Suitable backing materials include aluminum sheeting, galvanized steel, polymeric materials, such as polymethyl methacrylates, polyesters, polyamides, polyvinyl fluorides, polycarbonates, polyvinyl chlorides, and a wide variety of laminates made from these and other materials.

The retroreflective materials of the invention may be prepared in a variety of ways including embossing, casting, stamping or by other means of forming patterns in or with a transparent plastic material. The non-perpendicular triangular face of each element aids in the manufacture of the material in each of these methods by providing a relief surface to facilitate removal of the pattern forming means from the material.

One particularly useful manufacturing technique involves making a master mold by cutting grooves in two directions perpendicular to each other. One groove pattern is cut with an approximately 90° included angle symmetric tool. The grooves in the other direction are cut with an offset tool forming a vertical side wall (face 28) and a relief surface (face 30). Typically, the 90° grooves, which are cut to form the tetragonal faces 24, 25, have a depth, D, and a width, W equal to about 2D. Thus, the spacing between the peaks of the reflecting elements 20 is about 2D. D is typically between 0.02 and 10 mm.

To produce retroreflective material of the present invention which includes bisector elements, a master mold is made by cutting a first groove with an approximately 90° included angle tool. The 90° included angle tool is angularly symmetric (45° of the groove on each side of the perpendicular) for some cuts (perpendicular bisector elements) and positioned at varying degrees of asymmetry for others (canted bisector elements). The cut in the second direction is made as above with an offset tool to form a vertical sidewall and a relief surface, at angle alpha.

The angle, Beta, or the angle from the perpendicular at which the bisector is canted, is typically and preferably about 5° to 45°, and more preferably about 5° to 15°. The amount of cant of the bisector corresponds to the increase in angularity in the direction of the cant.

After the mold is cut, it then serves as a master mold for the manufacture of negative molds. Duplicates of the master mold can be made from the negative molds by electroforming or other well-known techniques for mold duplication. A transparent plastic film or sheet is then pressed against the duplicate mold or die to form or emboss in the film or sheet the pattern of the master mold. By controlling the dept of the impression on the plastic film or sheet, the base portion of the film or sheet which does not receive the mold impression then becomes the transparent cover sheet for the resulting retroreflective material, such as cover sheet 40 of FIG. 1.

The composite of reflecting elements and transparent cover sheet may be backed with a layer of material to strengthen the composite and to protect the reflective elements from dirt and moisture. Typically, the backing layer is an opaque thermoplastic film or sheet, preferably one having good weathering properties.

The backing film or sheet may be sealed in a grid pattern or in any other suitable configuration to the reflecting elements. Sealing may be affected by use of a number of methods, including ultrasonic welding, adhesives, or by heat sealing at discrete locations on the array of reflecting elements (see, for example, U.S. Pat.

No. 3,924,929). Sealing is important to prevent entry of soil and moisture and to preserve the air spaces around the cube corner reflecting surfaces.

If desired, the retroreflecting elements may be metallized. If the elements are metallized, the air spaces around the elements are not important, as the metal reflects light escaping from the elements.

If added strength or toughness is required in the composite, backing sheets of polycarbonate, polybutyrate or fiber-reinforced plastic may be used. Depending upon the degree of flexibility of the resulting retroreflective material, the material may be rolled or cut into strips or other suitable designs. The retroreflective material may also be backed with an adhesive and release sheet to render it useful for application to any substrate without the added step of applying an adhesive or using other fastening means.

The retroreflective material of the present invention is particularly useful for use in pavement markers, optimized for a small range of incident angles. For example if the sheeting were optimized for 60° incident angle, the sheeting could be mounted onto the face of a pavement marker forming a 30° angle with the road. Thus, the driver of a car would view the material at approximately a 60° incident angle. The material of the invention is particularly useful for intended incident angles of about 15°–90°, preferable about 20°–60°.

Referring to FIG. 7, the retroflectivity as a function of incident angle was measured for a conventional cube-corner film, a film as described in the White patent, and a film incorporating a retroreflective material of the present invention. The three materials were compared using reflective elements of the same refractive index (about 1.5). The conventional cube corner film contained 300 micrometer groove spacing trihedron corner cubes as described by Stamm (U.S. Pat. No. 3,712,706). The White patent film contained prism retroreflectors with a 350 micrometer groove spacing across the rectangular base, 325 micrometer spacing between the parallel end faces and a 175 micrometer gap between the end faces of adjacent prisms. The film of the present invention had 350 micrometer groove spacing across one direction of the rectangular base (corresponding to W in FIG. 2), 228 micrometer spacing across the other (corresponding to L in FIG. 4) and an angle alpha (see FIG. 4) of 30°. All of the material samples had nominally orthogonal reflecting faces.

As is shown, maximum retroreflectivity for conventional cube corner retroreflectors (curve 140) is obtained at low angles of incidence, on the order of about 0°–20° with the retroreflective energy falling to very small levels at an incident angle of about 40°. The small peak which was measured at 60° is believed to be caused by specular reflection. In the case of films utilizing the White retroreflective materials (curve 142), retroreflectivity increases initially with the angle of incidence, maintaining good results from about 20°–80°, and then diminishing as the angle of incidence approaches 90°. The retroreflective material of the present invention (curve 144) follows a path having a shape roughly similar to that of the White configuration reaching excellent levels at 20°–60°. The retroreflective material of the present invention demonstrated substantially higher absolute values than that of the White patent and also greatly increased levels over that of the conventional cube corner at incident angles greater than about 15°. The actual results used to formulate FIG. 7 is set forth in Table II below.

TABLE II

| | Candelas/Lux/Sq Meter | | |
|---|---|---|---|
| Incident Angle | Conventional (140) | White (142) | Present Invention (144) |
| 10° | 1822 | 882 | 1217 |
| 20° | 1076 | 1623 | 2695 |
| 30° | 422 | 1551 | 2670 |
| 40° | 234 | 1408 | 2378 |
| 50° | 46.7 | 1251 | 2283 |
| 60° | 401 | 938 | 2040 |
| 70° | 1.78 | 456 | 1205 |
| 80° | 0.19 | 79.1 | 202 |
| 90° | 0 | | 0 |

The retroreflective elements of the present invention may be individually tailored so as to distribute light retroreflected by the articles into a desired pattern or divergence profile, as taught by U.S. Pat. application, Ser. No. 933,470, filed Nov. 21, 1986, now Pat. No. 4,775,219. At least one of the tetragonal faces or the perpendicular triangular face may be tilted at an angle that differs from the angle which would be required for all dihedral angles within the cube corner formed therebetween to be orthogonal. It will typically only be necessary to tilt the faces a number of minutes and seconds away from 90°. Such variations may be accomplished by slight changes in tool angles.

The tilts in the angles of the faces to form non-orthogonal corners are included in sets or repeating patterns, divided into repeating sub arrays. The overall pattern of light retroreflected by an article, i.e., the divergence profile for the article, comprises the summation of the different light patterns in which the sub-arrays retroreflect incident light. Individual distinctively shaped light patterns can be selected to give the overall pattern a desired shape or contour.

It is desirable that the angle alpha be set according to the considerations discussed above. The first, second and third groove faces are the two tetragonal faces and the nearly perpendicular face respectively. These three faces define a cube-corner therebetween for each reflecting element. The groove side angle for the first, second, and third repeating pattern faces are varied to form slightly non-orthoganal cube-corners, divided into repeating subarrays to retroreflect incident light in distinctively shaped patterns.

What is claimed is:

1. A retroreflective material comprising a transparent surface layer and an array of reflecting elements, each of said reflecting elements including:
 (a) a rectangular base having a length L,
 (b) two mutually substantially perpendicular tetragonal faces having a line of intersection of length Y, said length Y being less than said length L,
 (c) a triangular face substantially perpendicular to said tetragonal faces; and
 (d) a non-perpendicular triangular face forming an angle alpha with a plane perpendicular to said base, said angle alpha being about $\sin^{-1}(0.25/n)$ to $\sin^{-1}(1/n)$, where n is the refractive index of the reflecting elements;

said triangular face and tetragonal faces defining a cube corner therebetween and said non-perpendicular triangular face and said tetragonal faces forming a non-orthogonal corner therebetween, said reflecting elements arranged with their bases adjacent said surface layer.

2. The retroreflective material of claim 1 wherein n is about 1.4–1.6.

3. The retroreflective material of claim 1 wherein said angle alpha is about $\sin^{-1}(0.35/n)$ to $\sin^{-1}(0.9/n)$.

4. The retroflective material of claim 1 wherein said tetragonal faces meet said base at substantially 45° angles.

5. The retroflective material of claim 1 wherein said reflecting elements are uniformly arranged.

6. The retroreflective material of claim 5 wherein the reflecting elements are arranged in rows and columns.

7. The retroreflective material of claim 6 in which the non-perpendicular faces in one column of reflectinhg elements and the substantially perpendicular triangular faces on the adjacent column of reflective elements share a common base line.

8. The retroreflective material of claim 7 in which tetragonal faces in one row of reflective elements and those in the adjacent row of reflective elements share a common base line.

9. The retroreflective material of claim 8 wherein the spacing between the lines Y of reflective elements in adjacent rows is twice the depth, D, of the reflective elements.

10. The retroreflective material of claim 1 wherein said reflecting elements are metallized.

11. The retroreflective material of claim 1 wherein said reflective elements have a depth, D, wherein D is about 0.02–10 millimeters, and L is about twice Y.

12. The retroreflective material of claim 1 further including canted bisector reflective elements each having a bisector of the angle of intersection of said mutually perpendicular tetragonal faces which intersects said base, said bisectors forming an angle, Beta with a line perpendicular with said base, wherein Beta is about 5°–45°.

13. The reteroreflective material of claim 12 wherein said angle Beta is about 5°–15°.

14. The retroreflective material of claim 12 wherein Beta is the same angle for each of said canted bisector reflective elements.

15. The retroreflective material of claim 12 wherein Beta varies randomly for said canted bisector reflective elements.

16. The retroreflective material of claim 12 wherein Beta varies in a uniform pattern for said canted bisector reflective elements.

17. The retroreflective material of claim 1 further including a backing layer.

18. The retroreflective material of claim 17 wherein said cube corners and non-orthogonal corners are adjacent said backing layer.

19. A retroreflective material comprising a transparent surface layer and an array of reflecting elements, each of said reflecting elements including:
   (a) a rectangular base having a length L,
   (b) two tetragonal faces nearly perpendicular to each other having a line of intersection of length Y, said length Y being less than said length L,
   (c) a triangular face nearly perpendicular to said tetragonal faces; and
   (d) a non-perpendicular triangular face forming an angle alpha with a plane perpendicular to said base, said angle alpha being about $\sin^{-1}(0.25/n)$ to $\sin^{-1}(1/n)$, wherein n is the refractive index of the reflecting elements;

said triangular face and tetragonal faces defining a cube corner therebetween and said non-perpendicular triangular face and said tetragonal faces forming a non-orthogonal corner therebetween, said reflecting elements arranged with their bases adjacent said surface layer; wherein said reflecting elements are formed by two perpendicular intersecting sets of parallel grooves, a first set of V-shaped grooves, each having a first and second face and a second set of grooves, each having a third face nearly perpendicular to the surface layer and a fourth face which is not perpendicular to the surface layer.

20. The retroreflective material of claim 19 in which at least one of said first, second, and third sets of faces includes, in a repeating pattern, at least one groove side angle that differs from another groove side angle of the same set.

21. The retroreflective material of claim 19 wherein n is about 1.4–1.6.

22. The retroreflective material of claim 19 wherein said angle alpha is about $\sin^{-1}(0.35/n)$ to $\sin^{-1}(0.9/n)$.

23. A retroreflective material comprising a transparent surface layer and an array of reflecting elements, each of said reflecting elements including:
   (a) a rectangular base having a length L,
   (b) two mutually substantially perpendicular tetragonal faces having a line of intersection of length Y, said length Y being less than said length L,
   (c) a triangular face substantially perpendicular to said tetragonal faces; and
   (d) a non-perpendicular triangular face forming an angle alpha with a plane perpendicular to said base, said angle alpha being in the range of 6°–65°;

said triangular face and tetragonal faces defining a cube corner therebetween and said non-perpendicular triangular face and said tetragonal faces forming a non-orthogonal corner therebetween, said reflecting elements arranged with their bases adjacent said surface layer.

24. The retroreflective material of claim 23 wherein said reflecting elements are uniformly arranged.

* * * * *

UNITED STATES PATENT AND TRADEMARK OFFICE
CERTIFICATE OF CORRECTION

PATENT NO. : 4,895,428
DATED : January 23, 1990
INVENTOR(S) : John C. Nelson, et al.

It is certified that error appears in the above-identified patent and that said Letters Patent is hereby corrected as shown below:

In Column 3, line 60 "orthoganol" should read --orthogonal--.

In Column 6, line 51 "dept" should read --depth--.

Signed and Sealed this

Twenty-fifth Day of June, 1991

Attest:

HARRY F. MANBECK, JR.

Attesting Officer

Commissioner of Patents and Trademarks